(12) United States Patent
Skarp

(10) Patent No.: US 10,547,887 B2
(45) Date of Patent: *Jan. 28, 2020

(54) MANAGING WIRELESS TRANSMISSION CAPACITY

(71) Applicant: CLOUDSTREET OY, Helsinki (FI)

(72) Inventor: Mika Skarp, Espoo (FI)

(73) Assignee: CLOUDSTREET OY, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/890,203

(22) PCT Filed: May 9, 2014

(86) PCT No.: PCT/FI2014/050342
§ 371 (c)(1),
(2) Date: Nov. 10, 2015

(87) PCT Pub. No.: WO2014/181042
PCT Pub. Date: Nov. 13, 2014

(65) Prior Publication Data
US 2016/0112742 A1   Apr. 21, 2016

(30) Foreign Application Priority Data
May 10, 2013 (FI) ................................. 20135485

(51) Int. Cl.
*H04N 21/262* (2011.01)
*H04W 28/20* (2009.01)
(Continued)

(52) U.S. Cl.
CPC . *H04N 21/26216* (2013.01); *H04N 21/26225* (2013.01); *H04N 21/26241* (2013.01);
(Continued)

(58) Field of Classification Search
CPC combination set(s) only.
See application file for complete search history.

(56) References Cited

U.S. PATENT DOCUMENTS 7,043,225 B1 * 5/2006 Patel .................... H04L 12/14
455/404.2
8,160,599 B2   4/2012 Stanforth et al.
(Continued)

FOREIGN PATENT DOCUMENTS

EP   1 672 952 A1   6/2006
GB   2 391 347 A    2/2004
(Continued)

OTHER PUBLICATIONS

International Search Report and Written Opinion dated Jul. 31, 2014 corresponding to International Patent Application No. PCT/FI2014/050342.

(Continued)

*Primary Examiner* — Hai V Tran
(74) *Attorney, Agent, or Firm* — Squire Patton Boggs (US) LLP

(57) ABSTRACT

An apparatus and method for managing wireless transmission capacity, comprising receiving by a server an indication about available wireless transmission capacity from a wireless transmission capacity provider, receiving by the server from a client an indication about wireless transmission capacity need concerning a user, reserving wireless transmission capacity for the user by the server based on the available wireless transmission capacity and wireless transmission need, and requesting the wireless transmission capacity provider to allocate the reserved wireless transmission capacity for the user.

18 Claims, 6 Drawing Sheets

(51) Int. Cl.
   *H04W 28/26* (2009.01)
   *H04N 21/2187* (2011.01)
   *G06Q 30/06* (2012.01)
   *H04N 21/61* (2011.01)
   *H04N 21/643* (2011.01)
   *H04W 28/02* (2009.01)
   *G06Q 50/30* (2012.01)

(52) U.S. Cl.
   CPC ... *H04N 21/6181* (2013.01); *H04N 21/64322* (2013.01); *H04W 28/0268* (2013.01); *H04W 28/20* (2013.01); *H04W 28/26* (2013.01)

(56) References Cited

U.S. PATENT DOCUMENTS

| | | | |
|---|---|---|---|
| 8,296,810 | B1 | 10/2012 | Everson et al. |
| 8,359,622 | B1 | 1/2013 | Everson et al. |
| 2001/0027484 | A1* | 10/2001 | Nishi ............... H04L 12/46 709/223 |
| 2001/0032262 | A1* | 10/2001 | Sundqvist ............... H04L 29/06 709/226 |
| 2002/0093948 | A1 | 7/2002 | Dertz et al. |
| 2002/0199012 | A1 | 12/2002 | Cable et al. |
| 2003/0110283 | A1 | 6/2003 | Lee |
| 2004/0128386 | A1 | 7/2004 | Oomoto et al. |
| 2006/0143111 | A1 | 6/2006 | Mylet |
| 2007/0293268 | A1* | 12/2007 | Isobe ............... H04N 7/17318 455/560 |
| 2009/0191858 | A1* | 7/2009 | Calisti ............... H04L 12/5695 455/422.1 |
| 2010/0161800 | A1 | 6/2010 | Moon |
| 2011/0154420 | A1* | 6/2011 | Korte ............... H04N 21/2221 725/109 |
| 2011/0162013 | A1 | 6/2011 | Bagasra et al. |
| 2011/0261695 | A1 | 10/2011 | Zhao et al. |
| 2011/0276431 | A1 | 11/2011 | Sturm et al. |
| 2011/0276719 | A1 | 11/2011 | Sturm et al. |
| 2012/0014255 | A1 | 1/2012 | Svedberg |
| 2012/0014332 | A1 | 1/2012 | Smith et al. |
| 2012/0016993 | A1 | 1/2012 | Kisel et al. |
| 2012/0058742 | A1* | 3/2012 | Razoumov ............... H04L 12/5691 455/406 |
| 2012/0133731 | A1 | 5/2012 | Lin et al. |
| 2012/0219014 | A1 | 8/2012 | Glaeser |
| 2012/0314127 | A1 | 12/2012 | Syed et al. |
| 2012/0324091 | A9* | 12/2012 | Raleigh ............... H04L 41/0893 709/224 |
| 2013/0035107 | A1 | 2/2013 | Chan et al. |
| 2013/0042275 | A1* | 2/2013 | Payette ............... H04N 21/2408 725/62 |
| 2013/0054298 | A1 | 2/2013 | Skarp et al. |
| 2013/0054833 | A1 | 2/2013 | Skarp et al. |

FOREIGN PATENT DOCUMENTS

| | | |
|---|---|---|
| GB | 2 423 216 A | 8/2006 |
| JP | 2007-336461 A | 12/2007 |
| WO | WO 2010/110707 A1 | 9/2010 |

OTHER PUBLICATIONS

International Preliminary Report on Patentability dated Aug. 13, 2015 corresponding to International Patent Application No. PCT/FI2014/050342.

International Search Report and Written Opinion dated Aug. 27, 2014 corresponding to related International Patent Application No. PCT/FI2014/050343.

German Office Action issued in corresponding German Patent Application No. DE 11 2014 002 348.5 dated Jul. 4, 2019.

German Office Action issued in corresponding German Patent Application No. DE 11 2014 002 365.5 dated Jul. 4, 2019.

Japanese Office Action issued in corresponding Japanese Patent Application No. 2016-512401 dated Apr. 9, 2018.

Japanese Office Action issued in corresponding Japanese Patent Application No. 2016-512402 dated Apr. 9, 2018.

\* cited by examiner

| | A1 | A2 | A3 | ... |
|---|---|---|---|---|
| 07:00 - 08:00 | AVAIL.: N/A<br>RESERVED: N/A | AVAIL.: N/A<br>RESERVED: N/A | AVAIL.: N/A<br>RESERVED: N/A | ... |
| 08:00 - 09:00 | AVAIL.: N/A<br>RESERVED: N/A | AVAIL.: N/A<br>RESERVED: N/A | AVAIL.: N/A<br>RESERVED: N/A | ... |
| 09:00 - 10:00 | AVAIL.: N/A<br>RESERVED: N/A | AVAIL.: N/A<br>RESERVED: N/A | AVAIL.: N/A<br>RESERVED: N/A | ... |
| ⋮ | ⋮ | ⋮ | ⋮ | ⋮ |

|  | A1 | A2 | A3 | ... |
|---|---|---|---|---|
| 07:00 - 08:00 | AVAIL.: 10<br>RESERVED: N/A | AVAIL.: 10<br>RESERVED: N/A | AVAIL.: 10<br>RESERVED: N/A | ... |
| 08:00 - 09:00 | AVAIL.: 10<br>RESERVED: N/A | AVAIL.: 10<br>RESERVED: N/A | AVAIL.: 10<br>RESERVED: N/A | ... |
| 09:00 - 10:00 | AVAIL.: 10<br>RESERVED: N/A | AVAIL.: 10<br>RESERVED: N/A | AVAIL.: 10<br>RESERVED: N/A | ... |
| ⋮ | ⋮ | ⋮ | ⋮ | ⋮ |

Fig. 6B

|  | A1 | A2 | A3 | ... |
|---|---|---|---|---|
| 07:00 - 08:00 | AVAIL.: 10<br>RES. USER A: 0<br>RES. USER B: 0 | AVAIL.: 10<br>RES. USER A: 0<br>RES. USER B: 0 | AVAIL.: 5<br>RES. USER A: 5<br>RES. USER B: 0 | ... |
| 08:00 - 09:00 | AVAIL.: 8<br>RES. USER A: 0<br>RES. USER B: 2 | AVAIL.: 8<br>RES. USER A: 0<br>RES. USER B: 2 | AVAIL.: 3<br>RES. USER A: 5<br>RES. USER B: 2 | ... |
| 09:00 - 10:00 | AVAIL.: 8<br>RES. USER A: 0<br>RES. USER B: 2 | AVAIL.: 8<br>RES. USER A: 0<br>RES. USER B: 2 | AVAIL.: 8<br>RES. USER A: 0<br>RES. USER B: 2 | ... |
| ⋮ | ⋮ | ⋮ | ⋮ | ⋮ |

Fig. 6C

MANAGING WIRELESS TRANSMISSION CAPACITY

FIELD OF THE INVENTION

The present invention generally relates to broadcasting content using wireless transmission capacity.

BACKGROUND OF THE INVENTION

A conventional architecture to broadcast an event in real time or near real time (live) on television or rich media devices is shown in FIG. 1. This architecture has some fundamental inconveniences for TV production companies, mobile TV, IPTV (Internet Protocol television) & internet TV providers like huge logistic cost and reduced flexibility.

In the architecture shown in FIG. 1, the broadcasting (such as, TV broadcasting) of an event 100 of local or regional (e.g. country wide) importance requires the deployment of a mobile control unit 103, commonly known as a satellite truck, to the event location. The mobile control unit 103 processes and transmits images taken by the cameras 102 (and transmitted to the mobile control unit 103 via a cable connection 104) to a TV station that hosts a Master Control Room (MCR) 107a, 107b.

Small to medium media production companies, IPTV, Internet TV and mobile TV providers who usually do not have the financial strength to invest in their own broadcasting equipment will have to rent the required resources from established major TV broadcasting companies. The costs related to the rent, deployment and maintenance of such equipment weigh on the profitability and make it difficult to a certain category of media production companies to enter or establish themselves into the live event broadcasting market.

One the biggest cost factor, besides the required equipment, when broadcasting an event in real time is generated by the transmission of the video signal:

Using microwaves (digital/analog terrestrial) (as depicted by arrow 105b) between the mobile control unit 103 and the local/regional TV station MCR 107b which dispatches the encoded TV/video signal via a TV-broadcasting tower 108b to the respective destination networks 109b; and/or Using (as depicted by arrows 105a and 106) a telecommunication satellite 101 between the mobile control unit 103 and the remote TV station MCR 107a that dispatches the encoded TV/video signal via TV-broadcasting tower 108a to respective destination networks 109a.

One potential way where the lack of flexibility has a negative effect is that usually there are several secondary events happening beside the main event: Interviews in the locker room before or after a game or live reports around the main event location. Those secondary events may have almost the same importance to the end consumer as the main event. Due to the size of the equipment and the required proximity between the cameras and the mobile control unit (for a live retransmission), it is not always possible to provide this information in real time to the end consumer.

SUMMARY

In the context of this application the term event is to be interpreted broadly. The term event should not be limited to cover only short term one-off type events like football games, but an event should be understood as anything that can be covered by a contract defining geographical coverage and duration.

In the architecture shown in FIG. 2, broadcasting of an event 100 in real time is arranged so that wireless enabled TV cameras 202 transmit a wireless signal 203 to a base station 201 of a wireless network, which can be, e.g., a cellular network. The base station 201 sends 204 the data via a communication network 210, using methods known as such, to TV-stations 107a, 107b via connections 205a, 205b. The TV-stations 107a, 107b take care of dispatching the encoded TV/video signal via TV-broadcasting towers 108a, 108b to the respective destination networks 109a, 109b.

This architecture is facilitated by the following technological factors:

The deployment of wireless networks, like LTE, across the globe, providing the required quality of service when transmitting a live TV stream over the air.

The availability of new TV-camera models, each with an incorporated wireless feature, such as a cellular modem. Those cameras can transmit captured images directly towards the wireless network to a destination platform.

The usage of the conventional satellite or microwave electronic newsgathering truck (reference 103 in FIG. 1) is not required. The related costs and effort can be reduced: less investment cost due to cheaper equipment and less operative cost due to the simplicity of the new mobile camera set.

The combination of those two factors provides a wide range of benefits, including reduced logistic efforts and lower transmission cost. The costs related to the transmission of content via satellite can get very high compared to the price for a similar bandwidth bundled LTE uplink connection using several SIM cards in the camera's embedded modem.

According to a first example aspect of the invention there is provided a method for managing wireless transmission capacity, comprising:

receiving by a server an indication about available wireless transmission capacity from a wireless transmission capacity provider;

receiving by the server from a client an indication about wireless transmission capacity need concerning a user;

reserving wireless transmission capacity for the user by the server based on the available wireless transmission capacity and wireless transmission need; and requesting the wireless transmission capacity provider to allocate the reserved wireless transmission capacity for the user.

The server may be a web server. It may be a broker server providing a brokering service between the wireless transmission capacity provider and the client. The server may reside in an IP network. The wireless transmission capacity provider may be a cellular network operator, a telecom operator. The server may be external to the cellular operator's network. The client (or customer) may be an event promoter, an event organizer, or a media company. The user is typically related to the client. The user may be an actual user (or subscriber) of the wireless transmission system, such as the cellular network. The cellular network may be an LTE network. The user may be identified by a user identity. The user may be a cellular modem camera containing a user identification module for user identification. Such a cellular modem camera may be used to capture an event and to transmit video/TV signals by the allocated capacity to the wireless transmission capacity provider's network to be further broadcasted or live streamed to consumer devices. A bundled LTE uplink connection may be used between cellular modem camera(s) and cellular network. The reserving and subsequent allocating may be performed for broadcasting content. The reserving and allocating may be performed for live broadcasting or live streaming a certain event, a media event.

In certain example embodiments, the available wireless capacity and the wireless transmission capacity need are time-dependent and said reserving is performed time-dependently. The allocating may be done for the reserved time period (duration of the reservation).

In certain example embodiments, the available wireless capacity and the wireless transmission capacity need are location-dependent and said reserving is performed location-dependently. The allocating may be done for the reserved geographical location.

In certain example embodiments, the method comprises maintaining a capacity area grid comprising time- and location-dependent information about available and reserved wireless transmission capacity.

In certain example embodiments, said requesting comprises sending an indication to modify service priority concerning said user. In certain example embodiments, the service priority is quality of service QoS priority.

In certain example embodiments, said wireless transmission capacity provider operates a cellular network and said requesting is performed from the outside of the cellular network.

In certain example embodiments, said requesting comprises indicating to modify priority of a user identity in a database, such as a Policy and Charging Rules Function (PCRF) database, a Home Subscriber Server (HSS) or Packet Data Network Gateway (PGW) of an LTE telecommunication network. Said database may be a network operator's database. Accordingly, said database may be a subscriber priority information database, the term comprising also network elements in which subscriber priority related information can be stored.

In certain example embodiments, said indicating to modify indicates to turn on the priority "Conversational video" in the Police and Charging Rule Function for said user identity for the duration of the time reserved.

Depending on the implementation, the indication about wireless transmission capacity need concerning a user is received from the client in response to an offer or before an offer. In certain example embodiments, the sending of an offer to the client may be omitted.

In certain example embodiments, there is provided a virtual, online, globally accessible market place where event promoters, media production companies and cellular network operators can:

Meet and trade the radio capacity required to cover an event in real time; and/or Automatically initiate the ordering process for the radio capacity sold/acquired on the virtual, online market place.

According to a second example aspect of the invention there is provided an apparatus for managing wireless transmission capacity, comprising:

means configured to receive an indication about available wireless transmission capacity from a wireless transmission capacity provider and an indication about wireless transmission capacity need concerning a user from a client;

means configured to reserve wireless transmission capacity for the user in the database based on the available wireless transmission capacity and wireless transmission need; and means configured to request the wireless transmission capacity provider to allocate the reserved wireless transmission capacity for the user.

The apparatus may be a server. It may be a broker server providing a brokering service between the wireless transmission capacity provider and clients. The server may be a server configured to operate in an IP network. In certain example embodiments, said means configured to receive indications comprises a communication module and a processor. In certain example embodiments, said means configured to reserve capacity comprises a database and said processor. In certain example embodiments, said means configured to request the wireless transmission capacity provider to allocate the reserved wireless transmission capacity comprises said processor and said communication module.

In certain example embodiments, said means configured to reserve comprises a database, and the apparatus is configured to maintain in the database a capacity area grid comprising time- and location-dependent information about available and reserved wireless transmission capacity.

In certain example embodiments, said means configured to request comprising a communication module, and the apparatus is configured to send via the communication module an indication to modify service priority concerning said user.

In certain example embodiments, the means configured to receive an indication about available wireless transmission capacity and an indication about wireless transmission capacity need are configured to receive time- and location-dependent information.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

BRIEF DESCRIPTION OF THE DRAWINGS

The invention will now be described, by way of example only, with reference to the accompanying drawings, in which:

FIG. 5 shows a visualization of a capacity area grid in accordance with an example embodiment; and FIGS. 6A-6C show capacity area usage scenarios in accordance with an example embodiment.

DETAILED DESCRIPTION

Figure 1:
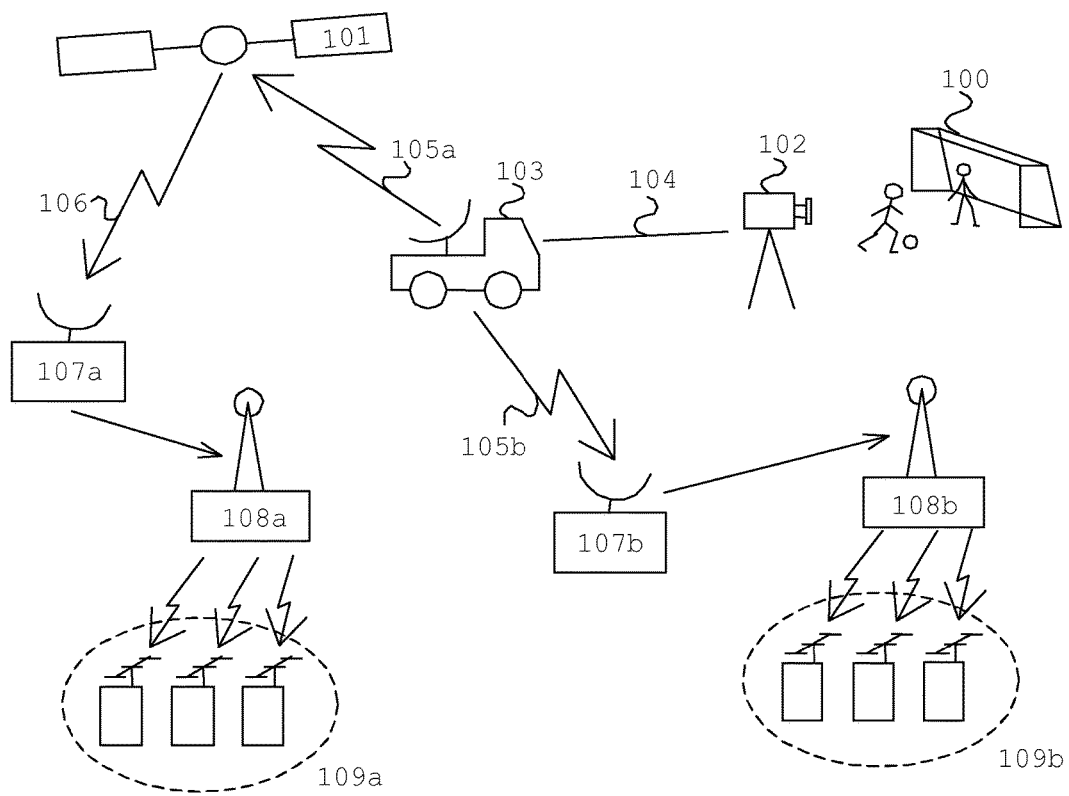
FIG. 1 shows a conventional architecture for implementing a live transmission of an event.
Figure 2:
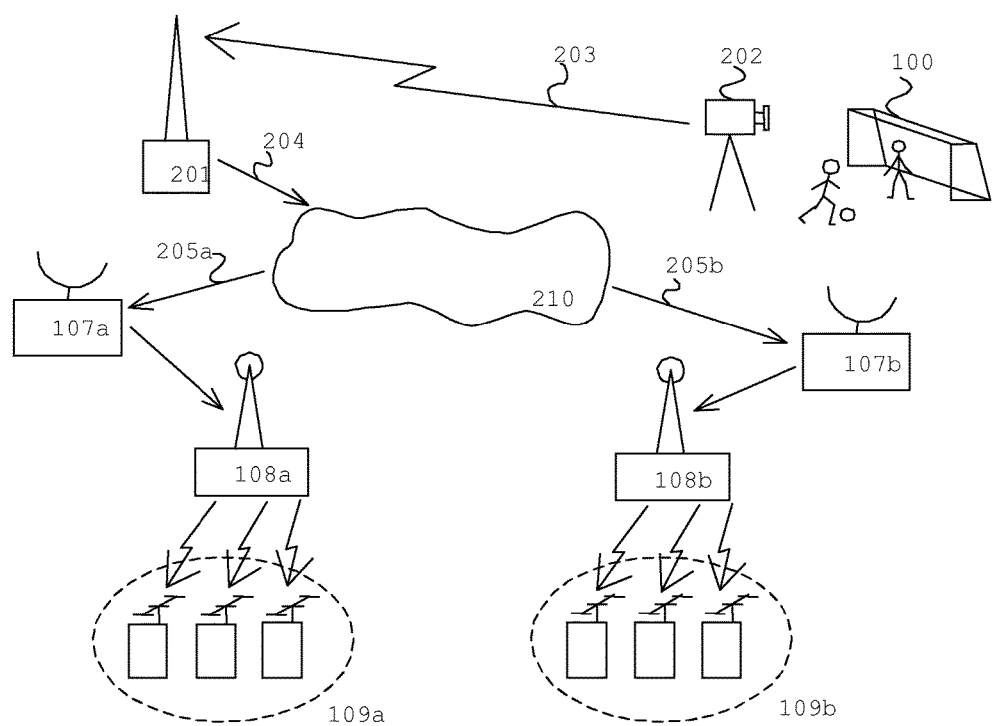
FIG. 2 shows an architecture for implementing a live transmission of an event in accordance with an example embodiment.
Figure 3:
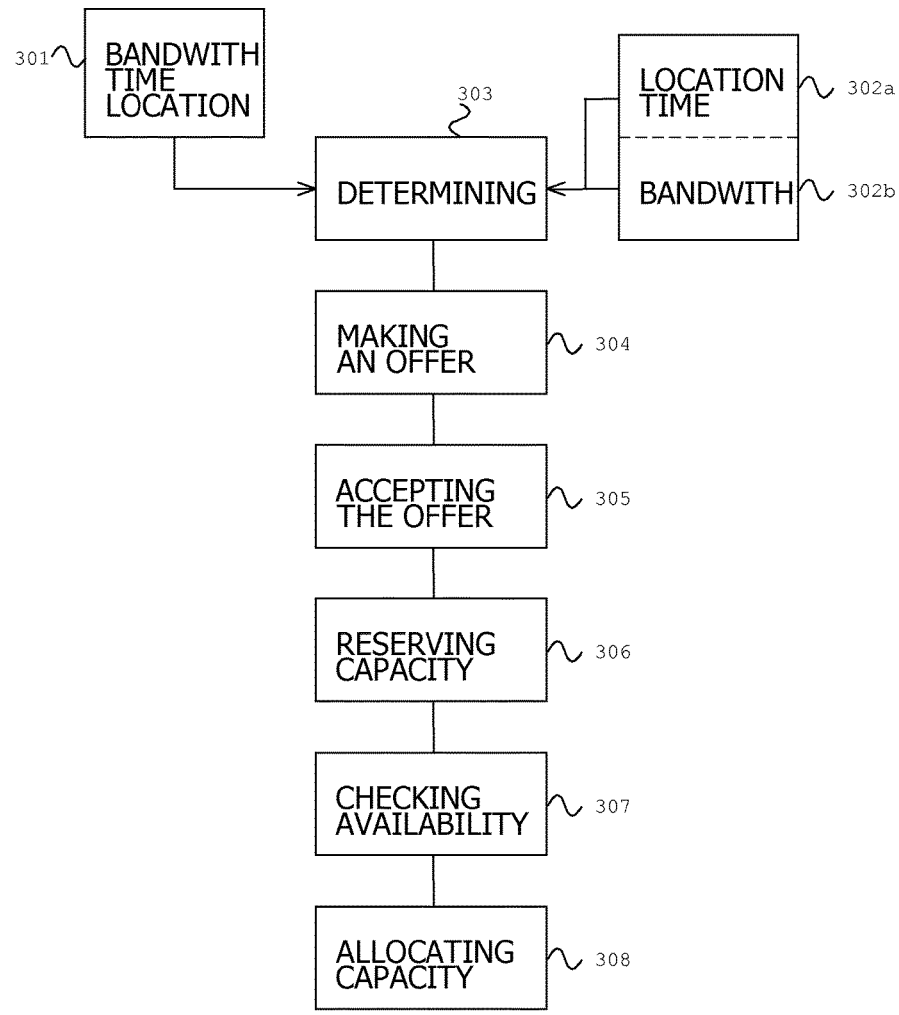
FIG. 3 shows a method for managing wireless transmission capacity in accordance with an example embodiment.

A method to manage wireless transmission capacity in accordance with an example embodiment is explained by referring to FIG. 3. The capacity could be used to provide media coverage for an event via streaming or some other broadcasting method.

In step 301, a mobile network operator or whoever has power to allocate wireless transmission resources (e.g., a Mobile Virtual Network Operator, MVNO) agrees with a broker service provider, represented by a server (more closely described in connection with FIG. 4), about the amount of wireless transmission capacity available for the broker service provider. As an example, the operator provides the broker service provider with information on bandwidth, time and location, i.e., where and when and how much bandwidth the broker service provider has in its disposal. In the simplest form the operator agrees to give a certain bandwidth at the whole area of its network 24/7. Alternatively, the operator provides for the broker service provider only the capacity it sees unlikely to sell itself. For example, the operator might keep the total capacity or a part of it during the peak hours, and only provide the remaining capacity for the broker service provider, and/or the operator might refrain from providing the broker service provider with at least a part of the capacity at predefined locations.

In steps 302a and 302b, the broker service provider is informed about the time and location of an event needing wireless transmission capacity, as well as the required bandwidth. An event organizer may inform (302a) the broker service provider about the time and location, e.g., a football game held in a certain stadium at a certain date and time. If the event organizer is also responsible for the live broadcast of the event, or if it knows the bandwidth requirements, it can also identify the bandwidth requirements needed (302b). However, it is alternatively possible that the bandwidth requirements are informed by a media company (or provider) responsible for covering the event. It is even possible that the media company has found the need for covering such an event from said broker service provider and offered their service to the event organizer, or the broker service provider may suggest a bandwidth and the event organizer or media company, as the role of a customer, may respond with the bandwidth requirement.

In an example embodiment, the information provided in steps 302a and 302b could, for example, comprise information like:
  Name of the event promoted (E.g. London Olympic games, soccer)
  Description of the event (Further information)
  Category (The category to which the event belongs to: sport, music, politics, etc.)
  Start: Start date and time of the event
  End: End date and time of the event
  Address: Main address where the event will take place
  Coordinates: GPS-coordinates to identify the geographical location where the event will take place
  Radius: Radius outgoing from the main address and defining the geographical area covered by the event
  Bandwidth: Bandwidth requirement.

Based on the information it received in step 301, the broker service provider knows the available wireless transmission capacity. It may, for example, use a capacity area grid, explained later in the description. In step 303, the broker service provider determines if there is capacity to fulfil the bandwidth requirement of the event in the location and times indicated.

If the available wireless capacity is found the broker service provider makes an offer in step 304 to the event organizer, or to the media company. Depending on how the broker service, provided by the broker service provider, has been build the offer can take different forms. If the broker service has a web-based interface for the customer to input their need, the offer may simply be a new pop-up window detailing the offer and asking the customer to accept of decline the offer. On the other hand, the broker service may be fully automatized; then the offer may be made between two pieces of software, one running in the broker server and the other running in a customer device (the customer in this embodiment meaning the event organizer and/or the media company). The communication between the operator and the broker service provider can be implemented in a similar way.

In step 305, the customer accepts the offer (or part of it). If the broker service provider suggests a bandwidth in the offer, the customer may, for example, accept the total bandwidth offered or only a part of it (if this already meets the bandwidth requirement the customer has).

In step 306, the broker service provider reserves the capacity accepted in step 305. This can be, for example, by updating the capacity area grid, as explained later in the description.

The time between the reservation, the actual event and the allocation of the capacity can vary a lot. Depending on the implementation, the allocation can be performed immediately after the reservation, or it can be performed months after the reservation. For this reason, the broker service provider can make a final check about the available resources at some time before the capacity is allocated, just to make sure that the resources are really available (step 307). This check can be performed by utilizing the capacity area grid, mentioned in the foregoing, and explained later in the description.

In step 308, the broker service provider sends a request to the operator to allocate the reserved capacity. The reserved capacity is allocated to be used to cover the reservation. The allocation is done, in certain example embodiments, by modifying the priority of at least one user identity in a database. The database can be a subscriber policy database or some other network element capable of storing subscriber priority related information. In the event of an LTE network, the function maintaining the database can be, e.g., a Policy and Charging Rule Function (PCRF), a Home Subscriber Server (HSS) or Packet Data Network Gateway (PGW). In certain example embodiments, the priority is modified by setting the service type attached to said at least one user identity to "Conversational video" in the Police and Charging Rule Function for the duration of the reservation (so that the priority related to that service type becomes also selected). A guaranteed bit rate radio resource type can be used. Said at least one user identity herein refers to the user identity in a user identification module of a cellular modem camera used to capture the event.

Figure 4:
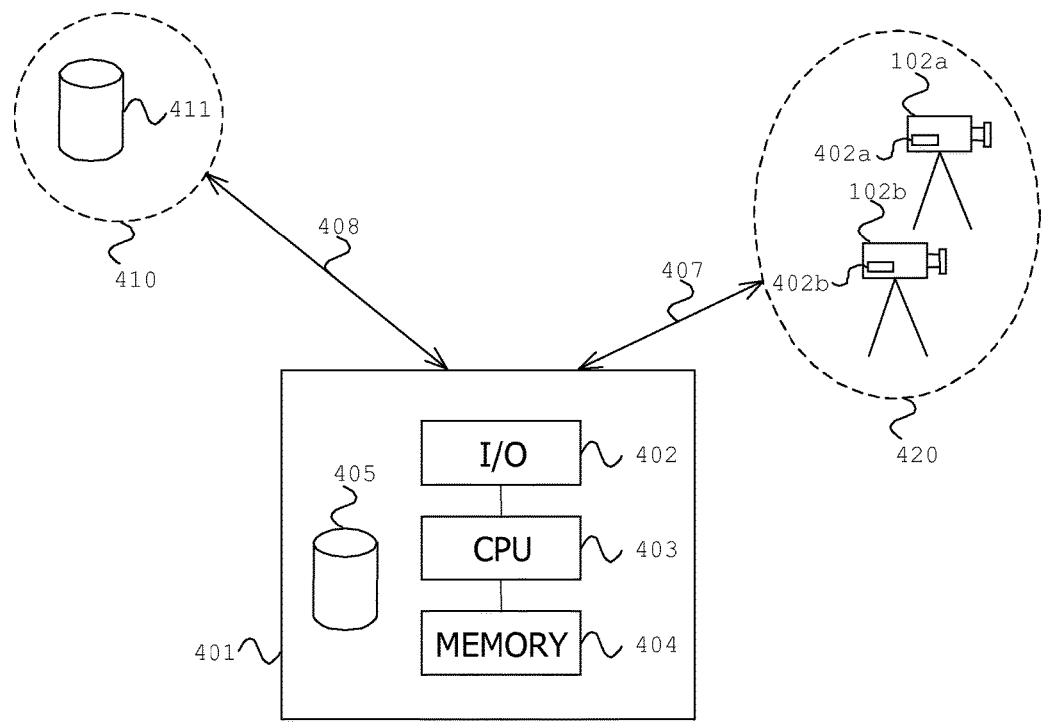
FIG. 4 shows an apparatus for managing wireless transmission capacity in accordance with an example embodiment.

FIG. 4. shows an apparatus for managing wireless transmission capacity in accordance with an example embodiment. The apparatus comprises a broker server 401. The broker server 401 comprises a processor (CPU or similar) 403. The broker server 401 further comprises a memory 404 connected to the processor 403. The processor 403 is configured to run broker server software stored in the memory 404 to control the operations of the broker server 401.

The broker server 401 further comprises an input/output system 402 (or a communication module) for communicating with the network of the event organizer or the media company 420 via a connection 407 and communicating via a connection 408 with the network (operator network) 410 providing wireless transmission capacity, such as the LTE network.

The broker server 401 further comprises a database 405 for storing a capacity area grid, or similar, with the aid of which the broker server 401 maintains the available wireless transmission capacity and its reservation.

The operator network (cellular network) 410 comprises a database 411, such as PCRF database for LTE network. As mentioned, the database can be a subscriber policy database or some other network element (such as the HSS or PGW) capable of storing subscriber priority related information. When the broker server 401, which may be a server external to the operator network 410, requests the operator network to allocate wireless transmission capacity in certain example embodiments, the PCRF database, HSS or PGW, depending on the implementation, is used as described in the foregoing.

The subscriber priority related information can be for example a quality class identifier such as QoS Class Identifier (QCI), which uses a single identifier to define several connection related parameters as shown in table 1. QCI is a parameter that gives details how the system handles packet forwarding. Following the example presented in the foregoing, giving the "Conversational video" priority for the subscriber, could be implemented by changing the QCI parameter to the value 2.

TABLE 1

QoS Class Identifier (QCI)

| QCI | Resource Type | Priority | Packet Delay Budget | Packet Error Loss Rate | Example Services |
|---|---|---|---|---|---|
| 1 | Guaranteed Bit Rate | 2 | 100 ms | $10^{-2}$ | Conversational Voice |
| 2 | Guaranteed Bit Rate | 4 | 150 ms | $10^{-3}$ | Conversational Video (Live Streaming) |
| 3 | Guaranteed Bit Rate | 3 | 50 ms | $10^{-3}$ | Real Time Gaming |
| 4 | Guaranteed Bit Rate | 5 | 300 ms | $10^{-6}$ | Non-Conversational Video (Buffered Streaming) |
| 5 | Non-guaranteed Bit Rate | 1 | 100 ms | $10^{-6}$ | IMS Signalling |
| 6 | Non-guaranteed Bit Rate | 6 | 300 ms | $10^{-6}$ | Video (Buffered Streaming) TCP-based (e.g., www, e-mail, chat, ftp, p2p file sharing, progressive video, etc.) |
| 7 | Non-guaranteed Bit Rate | 7 | 100 ms | $10^{-3}$ | Voice, Video (Live Streaming) Interactive Gaming |
| 8 | Non-guaranteed Bit Rate | 8 | 300 ms | $10^{-6}$ | Video (Buffered Streaming) TCP-based (e.g., www, e-mail, chat, ftp, p2p file sharing, progressive video, etc.) |
| 9 | Non-guaranteed Bit Rate | 9 | | | |

Another example for a subscriber priority related information to be used solely or in connection with other parameters to set priority of the subscriber according to an embodiment of the invention is an Allocation and Retention Priority (ARP) parameter. The ARP contains information about the priority level, the pre-emption capability and the pre-emption vulnerability of service/bearer. The priority level defines the relative importance of a resource request. This allows deciding whether a bearer establishment or modification request can be accepted or needs to be rejected in case of resource limitations (typically used for admission control of guaranteed bit rate traffic). It can also be used to decide which existing bearers to pre-empt during resource limitations.

The difference between QCI and ARP parameters is that QCI refers to priority in terms of resource allocation for a specific service by the same subscriber, i.e. in case where the a user equipment (UE) is running concurrently VoIP (higher QCI priority) session and browsing the web (lower QCI priority), the resources are assigned firstly to packets of VoIP and then to web browsing. On the other hand the ARP priority refers to priority in terms of allocation of a service/bearer, i.e. if the network is highly loaded and a subscriber would like to set-up a VoIP (higher ARP priority) and a web browsing (lower ARP priority) bearer, the network would typically set only a VoIP session, in order not to get overloaded. Or in other case if it is already overloaded it would kick off the bearers/services with lower ARP priorities.

In one example of the invention both the QCI and ARP parameter are used in combination to set priority of the subscriber according to an embodiment of the invention.

FIG. 4 further shows two wireless capable cameras, that is, cellular modem cameras 102a, 102b equipped with user identities in user identification modules 402a, 402b, like SIM cards. The user identities in the user identification modules represent users of the wireless transmission system, that is, users that need wireless transmission capacity (or radio resources) for communication of data, such as video/TV signals.

Figures 5, 6A:
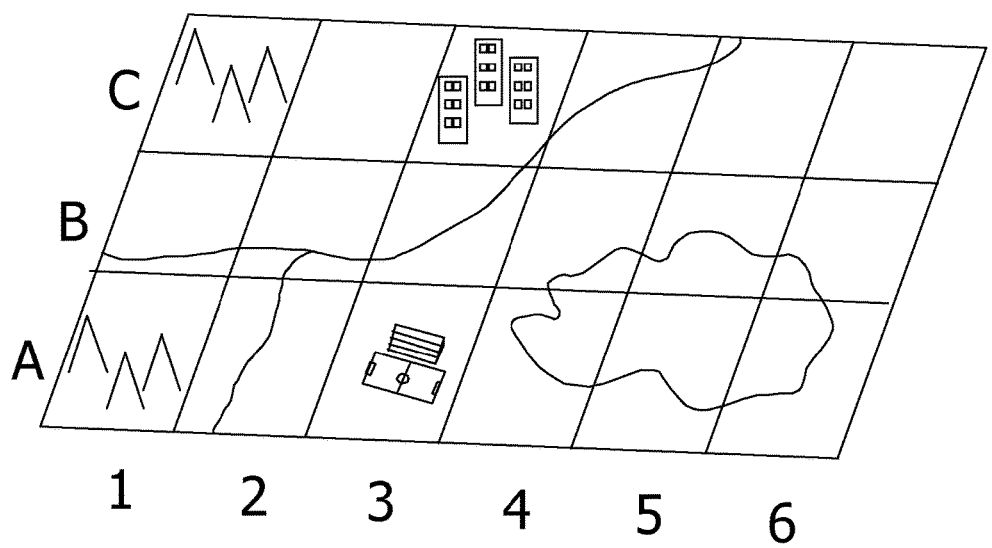

FIG. 5 shows the formation of a capacity area grid in accordance with an example embodiment. The cells of a capacity area grid herein are basically cells of a map grid identifying the geographical locations, here locations or cells A1-C6.

On each grid cell the broker service provider maintains information on how much capacity it has to available to sell and how much it has already reserved as a function of time. This is illustrated further in the capacity area grid usage scenarios of FIGS. 6A-6C.

FIG. 6A shows an empty grid before available wireless transmission capacity is received from the operator: All cells at all times: Availability=N/A and reservation=N/A.

FIG. 6B shows the capacity area grid in a situation in which the broker service provider has received the available wireless transmission capacity from the operator, but the broker service provider has not made any reservations yet: All cells at all times: Availability=10 MB and reservation=N/A. FIG. 6B assumes the simplest case in which the operator has given same resources to the whole network 24/7 (at all times). It should be noted that in practice the operator might want to vary the capacity it gives to the broker service provider based on location and/or time. This is fully supported by the grid, but left out in here to keep the example easier to understand.

FIG. 6C shows the capacity area grid in a situation in which the broker service provider has received the available wireless transmission capacity from the operator and also has made reservations for the users:

The broker has reserved 5 MB capacity for user A in the time period 07:00-09:00 in location A3 and 2 MB capacity for user B for the whole network from the time 08:00 onwards. The capacity area grid shows how much capacity is still left in each of the cells.

Without limiting the scope and interpretation of the patent claims, certain technical effects of one or more of the example embodiments disclosed herein are listed in the following: A technical effect is efficient wireless transmission capacity management based on available capacity and transmission capacity need. Another technical effect is providing a method and apparatus for reserving and allocating bandwidth for live broadcast transmission of an event.

It should be noted the some of the functions or method steps discussed in the preceding may be performed in a different order and/or concurrently with each other. Furthermore, one or more of the above-described functions or method steps may be optional or may be combined.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method for managing wireless transmission capacity, said method comprising:
   receiving by a service broker server, the service broker server being external to a network operated by a mobile network operator or a mobile virtual network operator, a first indication about available wireless transmission capacity for the service broker server to allocate in said network from the mobile network operator or the mobile virtual network operator that operates said network;
   based on the received first indication, maintaining, by the service broker server, information about the available wireless transmission capacity for the service broker server to allocate;
   after the first indication has been received by the service broker server, then receiving, by the service broker server from a client, a second indication about wireless transmission capacity need concerning a user;
   checking by the service broker server, that the wireless transmission capacity need indicated by the second indication can be fulfilled with the available wireless transmission capacity for the service broker server to allocate;
   generating by the service broker server, an offer to the client regarding the wireless transmission capacity for the user, the offer being based on the information about the available wireless transmission capacity for the service broker server to allocate, maintained by the service broker server and the wireless transmission capacity need;
   sending by the service broker server, the offer to the client;
   receiving by the service broker server, an acceptance of at least part of the offer from the client;
   reserving in a database in the service broker server, wireless transmission capacity for the user by the service broker server based on the accepted offer;
   after receiving an acceptance of the offer, requesting the mobile network operator or the mobile virtual network operator to allocate the reserved wireless transmission capacity for the user, said requesting comprising contacting a database in the network and indicating the database in the network to modify priority of a user identity of the user in the database in the network; and
   maintaining a capacity area grid comprising time- and location-dependent information about available and reserved wireless transmission capacity.

2. The method of claim 1, wherein the available wireless capacity and the wireless transmission capacity need are time-dependent and wherein said reserving is performed time-dependently.

3. The method of claim 1, wherein the available wireless capacity and the wireless transmission capacity need are location-dependent, and wherein said reserving is performed location-dependently.

4. The method of claim 1, wherein said requesting comprises sending a third indication to modify service priority concerning said user.

5. The method of claim 1, wherein said mobile network operator or said mobile virtual network operator operates a cellular network, the cellular network being an LTE network.

6. The method of claim 1, wherein said database in the network is a user database, and wherein the user database is a Policy and Charging Rule Function (PCRF), a Home Subscriber Server (HSS), or a Packet Data Network Gateway (PGW).

7. The method of claim 6, wherein said indicating to modify indicates to turn on the priority "Conversational video" in the Policy and Charging Rule Function for said user identity for the duration of the time reserved.

8. The method of claim 6, wherein said indicating to modify indicates to change at least a Quality of Service (QoS) Class Identifier (QCI) or Allocation and Retention Priority (ARP) parameter of said user.

9. The method of claim 6, wherein the database in the network comprises one of a Policy and Charging Rules Function (PCRF) database, a Home Subscriber Server (HSS) or Packet Data Network Gateway (PGW) of an LTE telecommunication network.

10. The method of claim 1, wherein the reserving of the resources is done only after the client has accepted at least part of said offer.

11. The method of claim 1, wherein in the event the client accepts only part of said offer, the method comprises reserving only the capacity reflecting to the accepted part of said offer.

12. The method of claim 1, wherein the offer is provided to the client via a web-based interface.

13. The method of claim 1, wherein the offer is made between two pieces of software, one running on the service broker server and one running on a customer device.

14. An apparatus for managing wireless transmission capacity, said apparatus comprising:
   means configured to receive a first indication about available wireless transmission capacity for the apparatus to allocate from a mobile network operator or a mobile virtual network operator that operates a network;
   means configured to maintain, based on the first indication, information about available the wireless transmission capacity for the apparatus to allocate;

means configured to, after the first indication has been received, receive a second indication about wireless transmission capacity need concerning a user from a client;

means configured to check if the wireless transmission capacity need indicated by the second indication can be fulfilled with the available wireless transmission capacity for the apparatus to allocate;

means configured to generate an offer to the client regarding the wireless transmission capacity for the user, the offer being based on the maintained information about the available wireless transmission capacity for apparatus to allocate and the wireless transmission capacity need;

means configured to send the offer to the client;

means configured to receive an acceptance of at least part of the offer from the client;

means configured to reserve wireless transmission capacity for the user in a database of the apparatus based on the accepted offer; and means configured to request the mobile network operator or mobile virtual network operator to allocate the reserved wireless transmission capacity for the user, said request comprising contacting a database in the network and indicating the database in the network to modify priority of a user identity of the user in the database in the network, wherein the apparatus is external to the network operated by the mobile network operator or the mobile virtual network operator.

15. An apparatus, comprising:

a processor;

at least one memory including computer program code;

the at least one memory and the computer program code configured to, with the processor, cause the apparatus to receive a first indication about available wireless transmission capacity for the apparatus to allocate from a mobile network operator or a mobile virtual network operator that operates a network;

maintain, based on the first indication, information about the available wireless transmission capacity for the apparatus to allocate;

after the first indication has been received, receive a second indication about wireless transmission capacity need concerning a user from a client;

check if the wireless transmission capacity need indicated by the second indication can be fulfilled with the available wireless transmission capacity for the apparatus to allocate;

generate an offer to the client regarding the wireless transmission capacity for the user, the offer being based on the maintained information about the available wireless transmission capacity for apparatus to allocate and the wireless transmission capacity need;

send the offer to the client;

receive an acceptance of at least part of the offer from the client;

reserve in a database of the apparatus wireless transmission capacity for the user based on the accepted offer; and request the mobile network operator or the mobile virtual network operator to allocate the reserved wireless transmission capacity for the user, said request comprising contacting a database in the network and indicating the database in the network to modify priority of a user identity of the user in the database in the network, wherein the apparatus is external to the network operated by the mobile network operator or the mobile virtual network operator, and wherein said processor and said memory are configured such that the wireless transmission capacity for the user is reserved in the database of the apparatus, and wherein the database of the apparatus includes a capacity area grid comprising time- and location-dependent information about available and reserved wireless transmission capacity.

16. The apparatus of claim 15, wherein said processor and said at least one memory are configured as a communication module, and wherein the communication module is configured to send a third indication to modify service priority concerning the user.

17. The apparatus of claim 16, wherein said third indication is an indication to change at least Quality of Service (QoS) Class Identifier (QCI), or Allocation and Retention Priority parameter (ARP) of the user.

18. The apparatus of claim 15, wherein the processor and at least one memory are configured such that when the offer is sent to the client or when an acceptance is received from the client, either or both are done through a web-based interface.

* * * * *